May 13, 1930.  J. F. ADAMS  1,758,639
ADJUSTING MECHANISM FOR MOTION PICTURE FILM FRAMING MEANS
Filed May 22, 1928
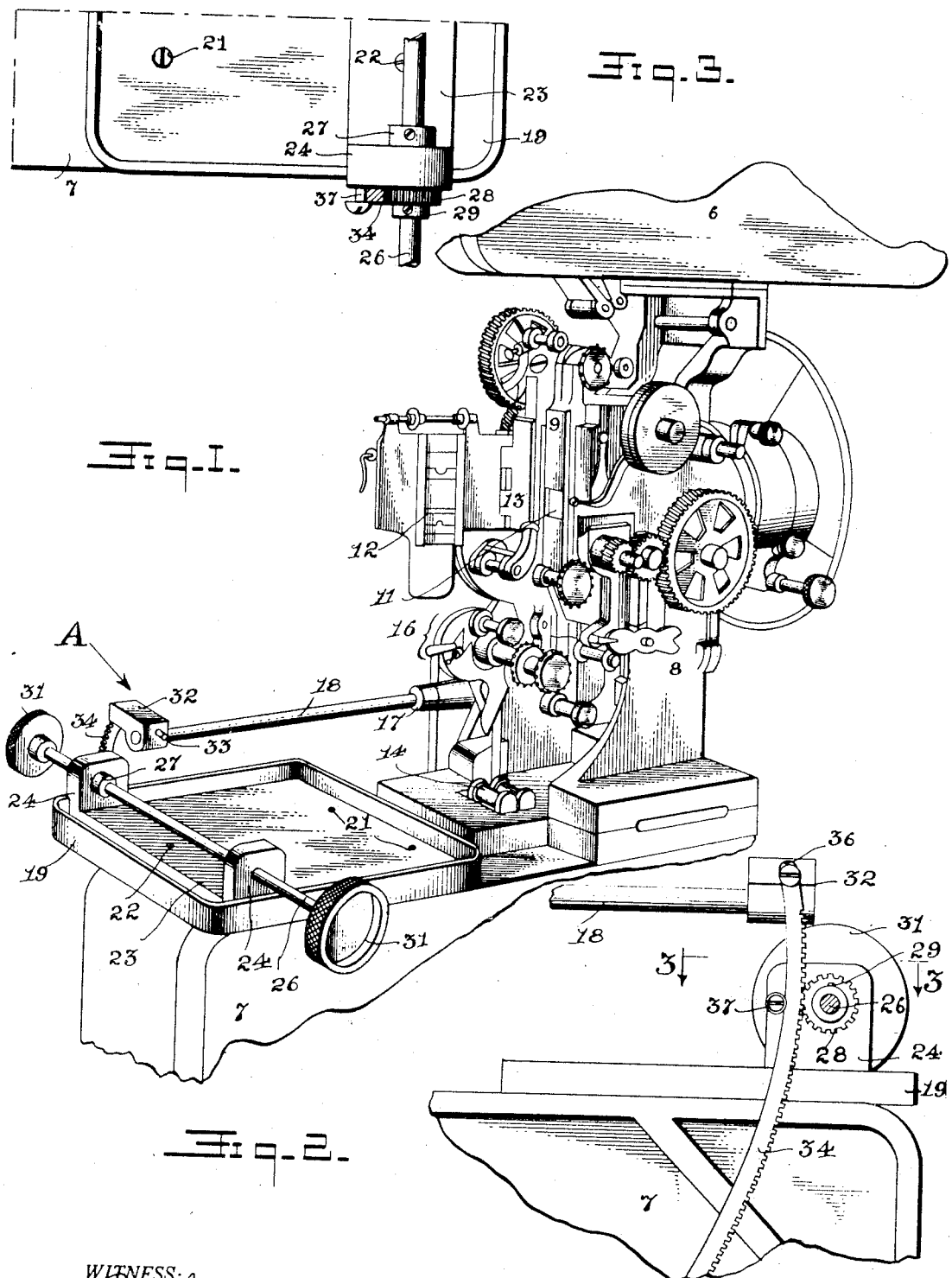
INVENTOR
John Francis Adams
BY
Joshua R. H. Potts
ATTORNEY Patented May 13, 1930

1,758,639

UNITED STATES PATENT OFFICE

JOHN FRANCIS ADAMS, OF PHILADELPHIA, PENNSYLVANIA

ADJUSTING MECHANISM FOR MOTION-PICTURE-FILM FRAMING MEANS

Application filed May 22, 1928. Serial No. 279,638.

This invention relates to motion picture machines and has particular reference to micrometer means for adjusting the framing mechanism on motion picture projecting machines.

The framing mechanism for the conventional motion picture machine is operated by a handle which has a lever action and which is elevated or lowered and is quite difficult to accurately manipulate by hand in order to frame the picture with any degree of precision.

The object of this invention is to provide means for positively and accurately adjusting the framing mechanism.

Another object is to provide means for precisely adjusting the framing mechanism in a facile manner.

Another object is to prevent creeping due to the looseness of the framing mechanism or vibrations of the mechanisms.

Another object is to provide means for operating the framing mechanism which will be always located in the same position and will be more accessible and within easy reach of the operator.

Another object is to provide means for operating the framing mechanism which will provide smooth action and therefore be less likely to break the film which, in the usual machines, is often injured by an abrupt operation of the framing handle.

Another object is to provide means, as above set forth, which is simple in construction and which may be economically manufactured and applied to standard motion picture projecting machines.

According to the invention, the framing mechanism of the ordinary motion picture machine is provided with a lever having means for attaching it to a rack, a pinion meshing with said rack, and means for rotating the pinion.

The drawings illustrate an embodiment of the invention and the views therein are as follows:—

Figure 1 is a perspective view of a portion of the motion picture machine to which the invention is applied.

Figure 2 is a fragmentary view of the lower reel box looking in the direction of the arrow A in Figure 1, and showing the operating shaft in section; and this view shows the manner of mounting the mechanism of the invention on the reel box, Figure 3 is a fragmentary sectional view taken on the line 3—3 of Figure 2.

In Figure 1, a portion of a standard machine has been shown for the purpose of illustrating the invention and includes a portion of the upper reel box 6, a portion of the lower reel box 7, and the intermediate head 8. The head carries the usual film feeding mechanism, which is ordinarily driven by a motor (not shown), and the figure shows the mechanism in position for receiving the film. The film is fed from the upper reel box through the slide 9 and over the aperture 11 and is enclosed by the aperture plate 12 which is swung on the hinge 13 after the film has been threaded through the feed mechanism. The film is passed downward through the rollers 14 into the lower reel box 7 for collection.

The framing mechanism 16 frames the film, that is to say, positions the frames of the film over the aperture 11 and, for the adjustment of this mechanism, there is a socket 17 which in the ordinary machine is provided with a handle (not shown) but which, for the purpose of this invention is dispensed with and the long rod 18 substituted therefor.

The lower reel box is provided with a tool tray 19 at the rear thereof and this tray is held thereon by means of screws 21 and for the purpose of this invention the rear screws are withdrawn and longer screws 22 substituted therefor in order to hold the bearing bracket 23 on said tray.

The bearing bracket has a standard 24 at each end thereof in which an operating shaft 26 is adapted to rotate. The shaft is provided with a collar 27 which is secured thereto and this collar is positioned adjacent the inner face of the left hand standard 24 while a pinion 28 is mounted on said shaft adjacent the outer face of said standard and is fixedly secured thereto by the set screw 29 in the hub thereof. The collar 27 and pinion 28 prevent lateral movement of the shaft 26.

Each end of the shaft is provided with a knurled or serrated operating or hand wheel 31 for rotating the shaft 26 and pinion 28.

The outer end of the rod 18 has a connecting block 32 secured thereon by a set screw 33. An arcuate rack 34 is pivotally secured at its upper end to said block by the screw 36.

This rack 34 extends downward along the outer face of the left hand standard 24 and meshes with the pinion 28 and it is held from lateral movement by the head of the screw 37 extending out from the outer face of said standard.

The framing of the film in the ordinary practice and when the handle is used for elevating and lowerinig the framing device 16, is very difficult, and in order to adjust the same with any degree of precision, it is usually necessary to gently tap the handle in order to get any nicety of adjustment.

With the micrometer mechanism of this invention the operating handles or hand wheels 31 can be rotated to provide precise adjustment without difficulty. The invention provides vernier mechanism of simple construction combined with accuracy of adjustment.

Of course, the adjusting means illustrated may be modified and changed in various ways and the means for mounting the same may be changed according to the particular type of machine to which the same is applied without departing from the invention as herein set forth and hereafter claimed.

I claim:—

Adjusting mechanism for motion picture film framing means comprising a rearwardly extending lever for raising and lowering the framing means to adjust the film with respect to the aperture, a block secured to the outer end of said lever, an arcuate rack pivotally connected by its upper end to the said block, a shaft having a pinion fixed thereon and meshing with said rack, a bracket having a pair of bearings for said shaft, screw means to said bracket for holding the rack and pinion in engagement, and means on said shaft for manually turning the same.

In testimony whereof I have signed my name to this specification.

JOHN FRANCIS ADAMS.